United States Patent [19]

Liu

[11] Patent Number: 4,666,985

[45] Date of Patent: * May 19, 1987

[54] COMPOSITION

[75] Inventor: Ping Y. Liu, Naperville, Ill.

[73] Assignee: General Electric Company, Mt. Vernon, Ind.

[ * ] Notice: The portion of the term of this patent subsequent to Jan. 7, 2003 has been disclaimed.

[21] Appl. No.: 829,119

[22] Filed: Feb. 14, 1986

Related U.S. Application Data

[63] Continuation of Ser. No. 743,526, Jun. 7, 1985, abandoned, which is a continuation of Ser. No. 574,572, Jan. 27, 1984, Pat. No. 4,563,502, which is a continuation of Ser. No. 421,789, Sep. 23, 1982, abandoned.

[51] Int. Cl.$^4$ .................................................. C08L 69/00
[52] U.S. Cl. .................................... 525/146; 525/147

[58] Field of Search ..................... 525/146, 468, 331.7, 525/333.7, 147; 528/196

[56] References Cited

U.S. PATENT DOCUMENTS

| 3,431,224 | 3/1969 | Goldblum | 525/146 |
| 3,654,219 | 4/1972 | Boyer et al. | 525/146 |
| 4,123,436 | 10/1978 | Holub et al. | 260/30.8 R |
| 4,131,575 | 12/1978 | Adelmann et al. | 260/17.4 R |

FOREIGN PATENT DOCUMENTS

| 705482 | 3/1965 | Canada . |
| 1495674 | 4/1969 | Fed. Rep. of Germany . |

Primary Examiner—Theodore E. Pertilla
Attorney, Agent, or Firm—Martin B. Barancik

[57] ABSTRACT

Thermoplastic molding composition of a polycarbonate and a linear low density polyethylene wherein a $C_4$–$C_7$ alpha-olefin is the comonomer.

11 Claims, No Drawings

COMPOSITION

This is a continuation of copending application Ser. No. 743,526, filed June 7, 1985, now abandoned, which is a continuation of application Ser. No. 574,572, filed on Jan. 27, 1984 and issued as U.S. Pat. No. 4,563,502, which is a continuation of application Ser. No. 421,789, filed on Sept. 23, 1982, now abandoned.

BACKGROUND OF THE INVENTION

Polycarbonate resins have high impact resistance with ductility to notch or crack propagation at an average of up to about 0.2 inches thickness when the incident notch is 10 mils (thousandths) of an inch in radius. Above this average thickness the impact resistance and ductility of polycarbonate resins decline. This phenomenon is commonly found in glassy plastics and is referred to as the critical thickness for notched impact resistance of a glassy plastic.

Additionally, the impact strength of notched polycarbonate resins decreases as temperatures decrease below about $-5°$ C. and also after aging the polymers at elevated temperatures above about 100° C. These temperatures are commonly found in applications where extremes of heat and cold are to be expected.

Thus, it is desirable to use a composition which extends the impact strength and ductility of polycarbonate resins to variable thickness parts or articles of use which resist embrittlement upon exposure to high or low temperatures in a notched or scratched condition.

Compositions are known which extend the high impact resistance and ductility characteristics of polycarbonate resins to parts beyond the critical thickness and under low and high temperature aging conditions, but many of these compositions suffer from incompatibilities of the polymeric components which results in poor weldline and knit line strengths of fabricated parts as evidenced by low double-gate impact strengths when measured according to ASTM D256.

It has been reported in a Research disclosure No. 20810, Dow Chemical Company, August, 1981 that polycarbonates modified with ethylene/octene-1 copolymer provide good impact strength at increased part thickness.

It has now been found that use of a modifier comprising ethylene copolymerized with lower carbon content comonomers, namely, $C_4$ to $C_7$ alpha-olefin comonomer, and particularly a linear low density polyethylene made with butene-1 as a comonomer in a polycarbonate resin results in a molding composition that may be utilized to make molded articles having improved properties in comparison with compositions of a polycarbonate and a linear low density polyethylene made with octene-1 as a comonomer. In particular, polycarbonate modified with a copolymer of ethylene and butene-1 has superior properties, e.g., impact strength, in comparison with polycarbonate modified at the same ratio with a copolymer of ethylene and octene-1, as will be shown later. In addition, the aromatic polycarbonate molding compositions made with modifiers comprising linear low density polyethylene including $C_4$ to $C_7$ alpha-olefin comonomers generally are less sensitive to property loss under high shear conditions of processing than those made with linear low density polyethylenes including octene-1 as a comonomer. Moreover, molded articles of the above two systems will show distinction favorable to $C_4$–$C_7$ alpha-olefin comonomers when placed under thermal aging system.

Compositions according to the present invention will have a weld line strength according to ASTM D256 of greater than about 7.0 ft./lbs. and preferably above about 9.5 ft/lbs.

DETAILED DESCRIPTION OF THE INVENTION

The compositions of the invention comprise:
(a) a high molecular weight aromatic polycarbonate resin; and
(b) a linear low density polyethylene made with a $C_4$–$C_7$ alpha olefin, preferably butene-1, as a comonomer.

The polycarbonate resin may be of the formula:

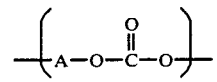

wherein A is a divalent aromatic radical. Preferred polycarbonate resins are of the formula:

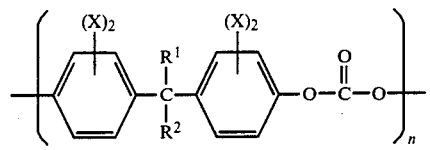

wherein $R^1$ and $R^2$ are hydrogen, (lower) alkyl or phenyl, X is selected from the group consisting of (lower) alkyl, chloro, bromo, hydrogen and mixtures thereof, and n is at least 30 or preferably from 40–400. The term (lower) alkyl includes hydrocarbon groups of from 1–6 carbon atoms.

Special mention is made of polycarbonate resins of the formula:

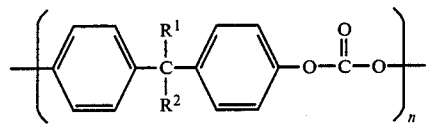

wherein $R^1$, $R^2$, and n are as above defined.

High molecular weight, thermoplastic aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of about 0.30 to 1.0 dl/g as measured in methylene chloride at 25° C. These polycarbonates are derived from dihydric phenols such as, for example, 2,2-bis(4-hydroxyphenyl)-propane, bis(4-hydroxyphenyl)methane, 2,2-bis(4-hydroxy-3-methylphenyl)propane, 4,4-bis(4-hydroxyphenyl)heptane, 2,2-(3,5,3'5'-tetrachloro-4-4'-dihydroxyphenyl)propane, 2,2-(3,5,3'5'-tetrabromo-4,4'-dihydroxydiphenyl)propane, and 3,3'-dichloro-4,4'-dihydroxydiphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436 or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The linear low density polyethylene (LLDPE) may be prepared from state of the art polymerization processes such as those described in U.S. Pat. No. 4,076,698 and Eur. Pat. Appl. No. 4,645, both of which are incorporated by reference. This polymer may have a density between about 0.89 and about 0.96 gms/cc and a controlled concentration of simple side chain branching—as opposed to random branching—which distinguishes it from polymers such as high pressure low density polyethylene and high density polyethylene. The preferred range of density is from 0.915 to 0.945 gms/cc. The LLDPE polymer used in the practice of the invention is made from ethylene and butene-1 or other alpha olefin of $C_4$-$C_7$ carbon content or mixtures thereof. The comonomer is used in a minor amount, i.e., 10 mol% or less of the total amount of monomers. A preferred range is about 1–3 mol%.

The preferred copolymers have a melt flow ratio of $<22$ to $\leq32$ and preferably $\geq25$ to $\leq30$, under temperature conditions specified below. The melt flow ratio of the copolymer is another means of indicating its molecular weight distribution. The melt flow ratio (MFR) range of $\geq22$ to $\leq32$ corresponds to a Mw/Mn value of about 2.7 to 4.1 and the MFR range of $\geq25$ to $\leq30$ corresponds to a Mw/Mn range of 2.8 to 3.6.

The MFR is determined by dividing the High Load Melt Index (HLMI) by the Melt Index (MI) measured at lower load. The MI is determined according to ASTM D-1238, Condition E, measured at 190° C. and reported as grams per 10 minute. The HLMI is determined by ASTM D-1238, Condition F, measured at 10 times the load used in the melt index test.

The density of the LLDPE copolymer employed herein is primarily regulated by the amount of the comonomer which is copolymerized with the ethylene. The addition of increasing amounts of the comonomer to the copolymer results in a lowering of the density of the copolymer.

The preferred copolymer is a copolymer made from ethylene and butene-1 such as Escorene LPX-15 (Exxon, Houston, Tex., USA). Typically, it has an unsaturated group content of $\leq1$ and preferably $\geq0.1$ to $\leq0.3$, $C=C/1000$ carbon atoms and less than about 3 and preferably less than 2 weight percent content (at 50° C.) of n-hexane extractables. The preferred material is made by the Unipol process which is described in Chem. Eng., Dec. 3, 1979, pp. 80–85 which is incorporated by reference.

The compositions of the invention may comprise from 70.0 to 99.5, preferably 80.0 to 99.5 parts by weight of polycarbonate resin (a) and 0.5 to 30, preferably 0.5 to 20, parts by weight of the linear low density polyethylene (b) per 100 parts by weight of the resinous components (a) and (b) in the composition. A preferred range comprises from about 4.0 to 20 and, more preferably, from about 5.0 to 15 parts by weight of the linear low density polyethylene per 100 parts by weight of the resinous components (a) and (b) in the composition. Special mention is made of compositions containing from about 90 to about 92 parts by weight of polycarbonate resin (a) and at least about 8 parts by weight of the linear low density polyethylene component (b) up to about 30 parts by weight, based on 100 parts by weight of (a) and (b) combined. Such compositions, as will be shown, offer substantial benefits in impact resistance in comparison with those in which the modifier is a low density polyethylene including octene-1 as the comonomer.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, is also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about $\frac{1}{8}"$ to about 1" long, preferably less than $\frac{1}{4}"$ in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Flame retardant amounts of flame retardants may also be utilized in the composition of the invention in amounts of from 0.5-50 parts by weight per 100 parts of resinous components. Examples of suitable flame retardants may be found in U.S. Pat. No. 3,936,400 and 3,940,366 which are incorporated by reference. Other conventional non-reinforcing fillers, antioxidants, extrusion aids, light stabilizers and the like may be added to the composition of the invention if desired.

The manner of preparing the invention composition is conventional. Preferably, each ingredient is added by passage through an extruder, or by fluxing on a mill at a temperature dependent on the particular composition. The mixed composition may be cooled and cut into molding granules and molded into the desired shape.

DESCRIPTION OF THE PREFERRED EMBODIMENTS

The following examples illustrate the invention. All parts are by weight.

EXAMPLE 1

A series of compositions were prepared using commercially available linear, low density polyethylenes. Each composition contained 4 parts of the LLDPE, made with butene-1 or with octene-1, per 96 parts by weight of polycarbonate of 2,2-bis(4-hydroxyphenyl)-propane having an I.V. of about 0.46 dl/g as measured in methylene chloride at 25° C. and was prepared by the conventional method of dry blending by mechanical mixing followed by extrusion at about 265° C. The extrudate was comminuted into pellets and the pellets were injection molded into test specimens that measured about $2\frac{1}{2}'' \times \frac{1}{2}'' \times \frac{1}{4}''$ and $2\frac{1}{2}'' \times \frac{1}{2}'' \times \frac{1}{8}''$.

These examples were compared against a composition of 4 parts by weight of high density polyethylene, commercially available as USI LB742, and 96 parts by weight of a standard polycarbonate resin, commercially available as Lexan ® 141-112. The term double gate is used to refer to the preparation of a molded sample in a mold having two entry ports that result in a weld line at the junction of the fluid resin in the mold during the molding cycle. The design, preparation of the molded part, and testing of the following examples are according to ASTM D256. Izod impact strengths are reported as ft. lb/in. of notch. Double gate values are reported in ft. lb. Below are the results in impact resistance in various test systems.

TABLE 1

| SAMPLE | TRADE NAME | IMPACT STRENGTH $\frac{1}{8}$ in. | IMPACT STRENGTH $\frac{1}{4}$ in. | DOUBLE GATE STRENGTH |
| --- | --- | --- | --- | --- |
| 1 | Lexan ® 141-112 polycarbonate | 14.6 | 1.6°* | 40.8 |
| 2 | USI LB742 HDPE | 14.6 | 11.3 | 2.3°* |
| 3 | Escorene LPX-12** | 14.4 | 8.1 | 20.2 |
| 4 | Dowlex 61500-0.4*** | 14.0 | 10.0 | 22.1 |
| 5 | Dowlex 61500-0.38*** | 14.0 | 9.8 | 11.7$^{40*}$ |
| 6 | Escorene LPX-15** | 14.3 | 10.1 | 16.9 |
| 7 | Escorene LPX-16** | 14.1 | 10.1 | 15.7 |

*Denotes % ductility of a 5 bar test set. All others were 100% ductile at failure
**A copolymer of ethylene and butene-1, Exxon Chemical Co., Houston, Texas, U.S.A.
***A copolymer of ethylene and octene-1, Dow Chemical Co., Midland, Michigan, U.S.A.

As clearly shown in the results, the 100% polycarbonate has high impact resistance in the $\frac{1}{8}''$ thickness but has lost virtually all its impact resistance at the $\frac{1}{4}''$ thickness, this being above the critical point in thickness. The double gate impact resistance value of Sample 1 is high since there is only one polymer present. The second sample is the prior art composition of polycarbonate plus high density polyethylene. A sharp improvement in impact resistance at the $\frac{1}{4}''$ thickness is shown; however the double gate impact resistance is sharply reduced and is brittle at failure. The various linear low density polyethylene/polycarbonate compositions of samples 3-7 show that the double gate impact resistance of the samples is substantially increased while the $\frac{1}{4}''$ impact resistance is, at worst, only somewhat lowered.

EXAMPLE 2

The procedure of Example 1 is repeated. A different grade of LLDPE is used (Escorene, Melt Flow Index 1), and there is used 10 parts by weight of LLDPE and 90 parts by weight of polycarbonate. The following results were obtained after molding and testing:

| Parts by weight (LLDPE**/PC*) | Notched Izod Impact, ft. lbs./in. $\frac{1}{8}''$ thick | Notched Izod Impact, ft. lbs./in. $\frac{1}{4}''$ thick |
| --- | --- | --- |
| 10/90 | 14.4$^{100}$ | 9.6$^{100}$ |

*Lexan ® 140
**Escorene LPX-1 (butene-1 as comonomer)

COMPARATIVE EXAMPLE 2A

The general procedure of Example 1 is repeated using instead 10 parts by weight of LLDPE and 90 parts by weight of polycarbonate, and as the LLDPE a copolymer of ethylene and octene-1. The following results were obtained after molding and testing:

| Parts by weight (LLDPE**/PC*) | Notched Izod Impact, ft. lbs./in. $\frac{1}{8}''$ thick | Notched Izod Impact, ft. lbs./in. $\frac{1}{4}''$ thick |
| --- | --- | --- |
| 10/90 | 8.2$^{100}$ | 4.2$^{100}$ |

*Lexan ® 140
**Dowlex 61500-0.38 Dow Chemical Co., Midland, Mich., U.S.A.

Comparison of Example 2 with Comparative Example 2A shows that polycarbonate compositions including a linear low density polyethylene made from butene-1 as a comonomer had significantly superior impact strength and excellent ductile impact strength in thicker sections than did those made with a linear low density polyethylene made from octene-1 as a comonomer. If the modifier content is at least 10 parts by weight per 100 parts of the total composition, then Example 2 demonstrates that the LLDPE containing butene-1 is more preferred than the LLDPE containing octene-1.

Other variations are possible in light of the above teachings. For example, instead of linear low density copolymers of ethylene with butene-1, there can be substituted copolymers of ethylene with, e.g., pentene-1, hexene-1, heptene-1 and the like in the range of $C_4$-$C_7$. It is therefore to be understood that changes may be made in the particular embodiments of the invention described which are within the full intended scope of the invention as defined by the appended claims.

What is claimed is:

1. A thermoplastic composition which comprises:
   (a) a major proportion of a high molecular weight aromatic polycarbonate resin; and
   (b) a minor proportion of a linear low density polyethylene resin having a density of from about 0.89 to about 0.96 gm./cc., said polyethylene resin comprising polymer chain units derived from ethylene and a minor amount of a comonomer consisting of an alpha-olefin having from 4 to 6 inclusive carbon atoms or a mixture of such alpha-olefins.

2. A thermoplastic molding composition which comprises:
   (a) a major proportion of a high molecular weight aromatic polycarbonate resin; and
   (b) a minor proportion of a linear low density polyethylene resin having a density of from about 0.89 to about 0.96 gm./cc., said polyethylene resin comprising polymer chain units derived from ethylene and a minor amount of hexene-1 as a comonomer.

3. A thermoplastic composition as defined in claim 1 wherein the linear low density polyethylene has a density of from about 0.915 to about 0.945 gm./cc.

4. A thermoplastic composition as defined in claim 1 wherein the linear low density polyethylene is the product of a low pressure gas phase process.

5. A thermoplastic molding composition as defined in claim 1 wherein the linear low density polyethylene is a virgin ethylene copolymer formed from ethylene and hexene-1 with a melt flow ratio of $\geq 22$ to $\leq 32$, and an unsaturated group content of $\leq C=C/1000$ carbon atom.

6. A thermoplastic composition which comprises:
   (a) from about 70 to about 92 parts by weight of a high molecular weight aromatic polycarbonate; and
   (b) from about 8 to about 30 parts by weight of a linear low density polyethylene resin having a density of from about 0.89 to about 0.96 gm./cc., said polyethylene resin comprising polymer chain units derived from ethylene and a minor amount of a comonomer consisting of an alpha-olefin having from 4 to 6 inclusive carbon atoms or a mixture of such alpha-olefins, per 100 parts by weight or components (a) and (b) in said composition.

7. A thermoplastic composition which comprises:
   (a) from about 70 to about 92 parts by weight of an aromatic polycarbonate resin; and
   (b) from about 8 to about 30 parts by weight of a linear low density polyethylene resin having a density of from about 0.89 to about 0.96 gm./cc., said polyethylene resin comprising polymer chain units derived from ethylene and a minor amount of hexene-1 as a comonomer, per 100 parts by weight of components (a) and (b) in said composition.

8. A thermoplastic molding composition as defined in claim 1 wherein the high molecular weight polycarbonate resin is of the formula:

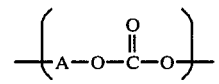

wherein A is a divalent aromatic radical of a dihydric phenol.

9. A thermoplastic molding composition as defined in claim 1 wherein the high molecular weight polycarbonate is of the formula:

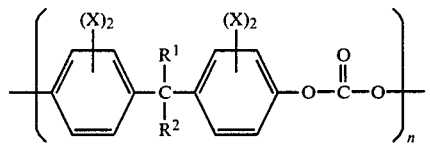

wherein $R^1$ and $R^2$ are hydrogen, (lower) alkyl or phenyl, X is selected from the group consisting of hydrogen, (lower) alkyl, chloro, bromo and mixtures thereof, and n is at least 30.

10. A thermoplastic molding composition as defined in claim 1 which includes from 70 to 99.5 parts by weight of the high molecular weight polycarbonate resin (a) and from 0.5 to 30 parts by weight of linear low density polyethylene resin (b) per 100 parts by weight of total resinous components (a) and (b) in said composition.

11. A thermoplastic molding composition as defined in claim 10 wherein the high molecular weight polycarbonate is derived from 2,2-bis(4-hydroxyphenyl)propane said composition having from about 85–96 parts by weight of the high molecular weight polycarbonate resin (a) and from about 4–15 parts by weight of linear low density polyethylene resin (b) per 100 parts by weight of total resinous components (a) and (b).

* * * * *